United States Patent [19]

Dickinson et al.

[11] 4,410,072
[45] Oct. 18, 1983

[54] GRAVITY CONTROLLED ANTI-REVERSE ROTATION DEVICE

[75] Inventors: Robert J. Dickinson, Shaler Township, Allegheny County; Todd M. Wetherill, Lower Burrell, both of Pa.

[73] Assignee: Westinghouse Electric Corp., Pittsburgh, Pa.

[21] Appl. No.: 293,046

[22] Filed: Aug. 14, 1981

[51] Int. Cl.³ .................. B60T 8/02; F16D 49/00
[52] U.S. Cl. .................. 192/8 R; 188/82.77; 188/186
[58] Field of Search ............. 192/8 R, 4 R; 188/82.7, 188/82.77, 82.3, 82.4, 180, 181 R, 184, 185, 186

[56] References Cited

U.S. PATENT DOCUMENTS

| | | |
|---|---|---|
| 697,393 | 4/1902 | Beck . |
| 1,090,570 | 3/1914 | Schelling et al. . |
| 1,383,201 | 6/1921 | Gormley . |
| 1,516,681 | 11/1924 | Palmer .................. 188/82.7 |
| 1,754,786 | 4/1930 | East . |
| 1,846,259 | 2/1932 | Johnston ............... 188/82.7 X |
| 1,908,905 | 5/1933 | Landahl . |
| 2,543,482 | 2/1951 | Williams . |
| 2,687,785 | 8/1954 | Whitney . |
| 2,750,007 | 6/1956 | Turner et al. ............ 188/82.77 X |
| 3,135,137 | 6/1964 | Cunningham . |
| 3,354,993 | 11/1967 | van der Lely .......... 188/82.77 |
| 3,452,840 | 7/1969 | Cain . |
| 3,590,656 | 7/1971 | Lloyd . |
| 3,912,192 | 10/1975 | Shirley . |
| 4,044,969 | 8/1977 | Wallin . |
| 4,085,905 | 4/1978 | Lindbald . |

Primary Examiner—George H. Krizmanich
Attorney, Agent, or Firm—Kenneth R. Bowers

[57] ABSTRACT

A gravity assisted anti-reverse rotation device for preventing reverse rotation of pumps and the like.

A horizontally mounted pawl is disposed to mesh with a fixed ratchet preventing reverse rotation when the pawl is advanced into intercourse with the ratchet by a vertically mounted lever having a lumped mass. Gravitation action on the lumped mass urges the pawl into mesh with the ratchet, while centrifugal force on the lumped mass during forward, allowed rotation retracts the pawl away from the ratchet.

4 Claims, 5 Drawing Figures

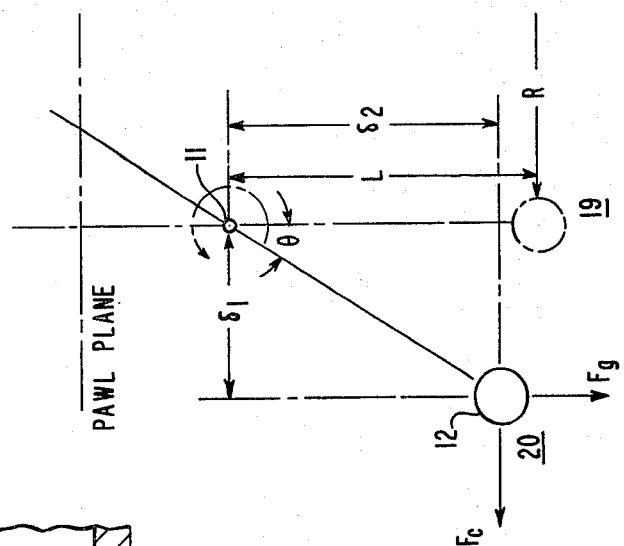
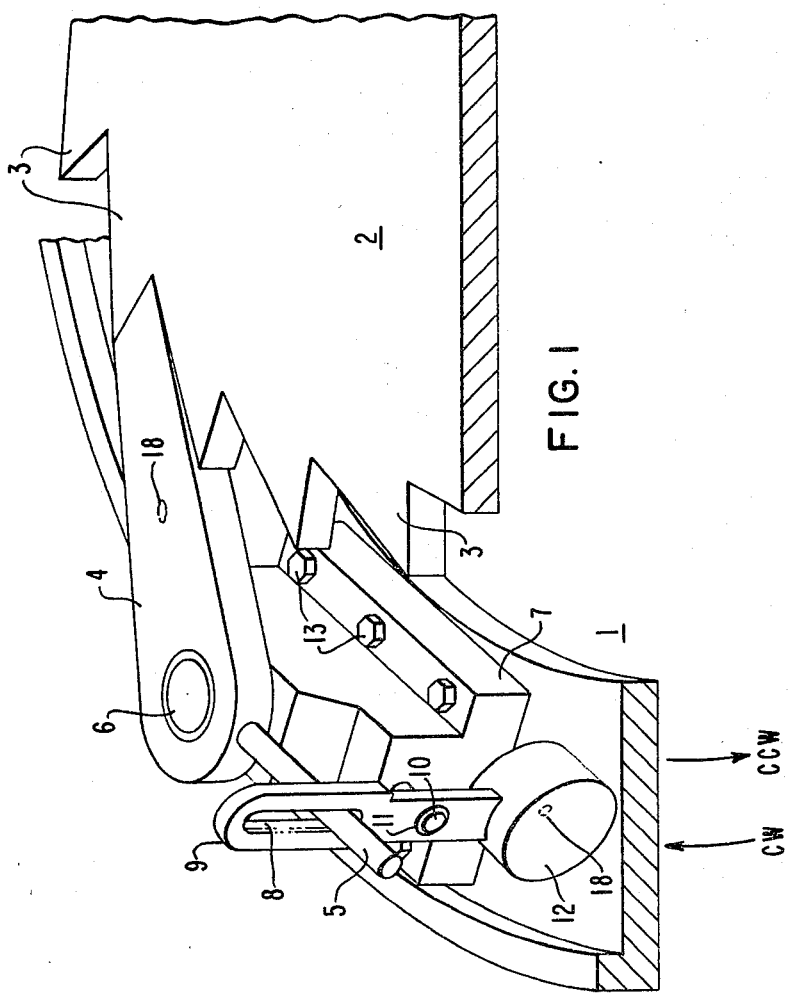
FIG. 1
FIG. 5

GRAVITY CONTROLLED ANTI-REVERSE ROTATION DEVICE

GOVERNMENT CONTRACT

This invention was conceived during performance of a contract with the U.S. Government designated W-31-109-38-5001.

BACKGROUND OF THE INVENTION

1. Field of the Invention

This invention is a device for preventing reverse rotation of a shaft of a turbine or pump, or the like, while allowing unencumbered rotation of the shaft in a forward direction.

2. Description of the Prior Art

Devices for preventing reverse rotation are well known and widely employed. Commonly, a rotating shaft has a circumscribing ratchet with a lever or pawl disposed to engage teeth of the ratchet preventing rotation in a disallowed direction. A variety of schemes are used to withdraw the pawl from intercourse with the ratchet during forward, allowed rotation of the shaft. A most common technique is to employ centrifugal force generated by the rotating shaft to control the pawl.

In different systems, the ratchet may be fixed, while the pawl rotates with and is integral to the shaft, or vice versa.

For examples of prior art, refer to the following U.S. patents:

| | | |
|---|---|---|
| Antireversing Pump Head | Palmer | U.S. Pat. No. 1,516,681 |
| Brake . . . Like | Gornley | U.S. Pat. No. 1,383,201 |
| Restraining Device | Shirley | U.S. Pat. No. 3,912,192 |
| Gravity and . . . Mechanism | Whitney | U.S. Pat. No. 2,687,785 |
| Blocking . . . Vehicles | Lindbald | U.S. Pat. No. 4,085,905 |

Anti-reverse rotation devices typically have a wear and noise problem associated with ratchet-pawl contact during periods (perhaps prolonged) of low shaft rotation speed. In some cases, the pawl may ride on the ratchet in a low speed range, or may even bounce in and out of engagement.

Consequently, it is desired to provide an anti-reverse rotation device which achieves total ratchet-pawl disengagement at a low shaft speed. Moreover, it is desired to achieve this while utilizing a simple mechanism using a minimum of components requiring maintenance, and with no external controls.

SUMMARY OF THE INVENTION

The invention is an anti-reverse rotation device using a stationary ratchet and a rotating pawl. A pawl control system rotates with the shaft and uses forces due to windage, centrifugal force on a lumped mass, and centrifugal force on the pawl, to disengage the pawl from the ratchet. Positive engagement is by gravitational force on the lumped mass.

Due to the triple sources of disengagement, and other features, a very low disengagement speed is achieved. Operation is automatic and inherent, with no external controls.

BRIEF DESCRIPTION OF THE DRAWINGS

FIG. 1 is a schematic of the device shown in an engaged configuration;

FIG. 5 is a schematic force diagram.

DETAILED DESCRIPTION

Figure 2:
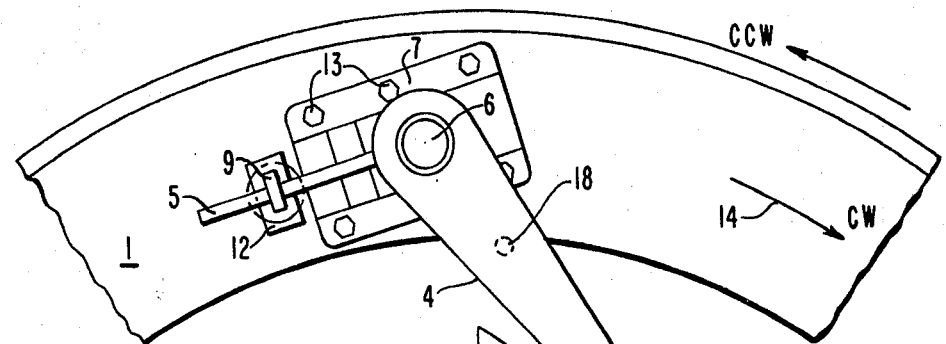
FIG. 2 is a plan view of the device shown in the engaged configuration.

The device consists of two moving parts mounted on a common base. A pawl (first moving part) moves horizontally and pivots about a loose-fitting pin whose axis is vertical. Anti-reverse rotation loads are taken by this pawl and pin. The vertical load due to the pawl's own weight is taken by a ball-bearing assembly or other low friction surface, allowing the pawl to move nearly unrestrained about this point. A pawl arm (second moving part) extends from the pawl in line with the pawl pivot pin. This arm passes freely through a slotted lever mounted vertically on the common base.

This lever is weighted at the lower end and slotted at the upper end, and serves both as an engaging and disengaging mechanism for the anti-reverse rotation device. The lever pivots about a pin which extends from the common base. Friction at this point is reduced by a ball-bearing insert or similar low friction bearing arrangement. The weight at the lower end of the lever can be a cylinder, or could be any type of lumped mass as desired. As mentioned, the upper end of the lever is slotted to accommodate and control the pawl arm, and subsequently the pawl motion. The slot is adequately long to allow maximum motion of the pawl, and the inside of the slot is rounded and so sized so to allow angular variations in the pawl arm orientation.

The common base is mounted on and fixed (bolted) to a rotating member. This base is positioned such that when the rotating member is at rest, the pawl is engaged properly against the stationary ratchet plate and thus prevents reverse rotation.

The pawl and/or stationary ratchet teeth may incorporate special materials to reduce wear and noise during short-term start-up/coastdown contact.

Refer to FIG. 1, which shows an anti-reverse rotation device installed for a rotating component 1, which may be a motor, pump, turbine shaft, or the like. Rotating member 1 is shown to be a relatively large component in FIG. 1 and is preferably a flange or otherwise-termed component fixed to a rotating system of interest. Rotating member 1 surrounds and rotates about a fixed, stationary ratchet 2 having a plurality of teeth 3 suitably shaped, aligned, and positioned to mate with an end of a pawl 4 when pawl 4 is advanced into intercourse with ratchet 2 by a pawl arm 5. Such mating prevents rotation of component 1 in at least one disallowed direction (clockwise in FIG. 1).

Pawl 4 is free to pivot around pawl pin 6 mounted in base 7. Pawl arm 5 extends through slot 8 in lever 9 which lever 9 is supported (and free to pivot around) lever pin 10 which is also mounted in base 7. In FIG. 1, ball bearings 11 are shown installed at lever pin 10 to reduce friction. Lumped mass 12 is fixed to an end of lever 9.

FIG. 1 shows the anti-reverse rotation device in the engaged configuration which exists when rotating component 1 is stationary. Lever 9 is vertically disposed and pawl 4 is affirmatively held by lever 9 in contact with ratchet 2, preventing reverse, clockwise (CW) rotation. Rotating component 1 is free to rotate counter-clockwise (CCW).

FIG. 2 is a plan view of the device shown in an engaged configuration. Arrow 14 indicates the direction of disallowed reverse rotation of rotating component 1.

Figure 3:
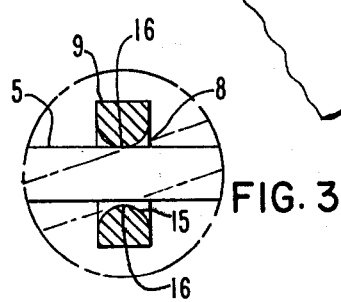
FIG. 3 is a detail from FIG. 2.

FIG. 3 is a detail from FIG. 2 which shows the rounded surface 15 of slot 8, which rounded surface 15 allows pawl arm 5 to tilt somewhat within slot 8. Pawl arm 5 is cylindrical for at least that portion of its length which slides through slot 8 over the full travel of pawl 4 from engaged to disengaged positions. Contact between pawl arm 5 and lever 9 is then of cylinder-to-cylinder line geometry, minimizing friction. (See line 16, which appears as two points in FIG. 3.)

Figure 4:
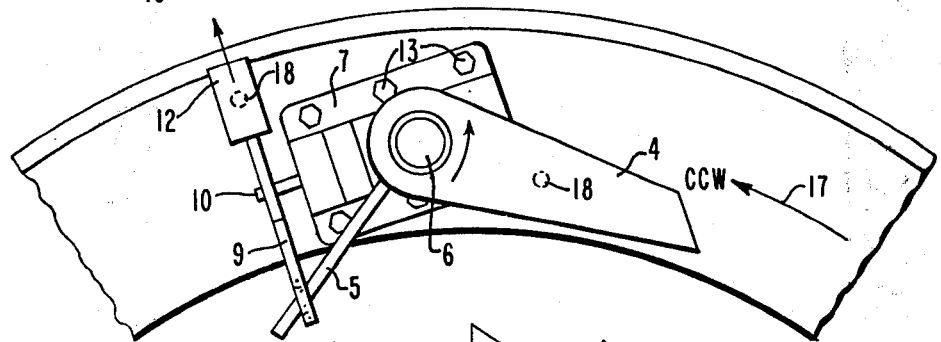
FIG. 4 is a schematic of the device shown in the disengaged configuration.

FIG. 4 depicts the device in the configuration assumed when rotating component 1 rotates in the direction of arrow 17. Lumped mass 12 has moved radially outward due to centrifugal force, pivoting lever 9 about lever pin 10. Lever 9 transmits force to pawl arm 5 which pivots pawl 4 about pawl pin 6, disengaging pawl 4 from teeth 3.

OPERATION

The operation of the device is now described beginning with the stationary component 1 and engaged pawl 4 of FIG. 2. Reverse rotation in the clockwise direction is prevented by pawl 4. Assume that component 1 begins to rotate counterclockwise (in the allowed direction). Mechanical interaction with teeth 3 will rotate pawl 4 until pawl 4 is almost clear of teeth 3.

As the anti-reverse rotation device begins to rotate, centrifugal forces will develop at the centers of gravity 18 of pawl 4 and lumped mass 12. Pawl 4 itself will tend to rotate about pivot pin 6. Its motion is only restricted by its interaction with slotted lever 9. Lumped mass 12 will tend to move radially outward causing lever 9 to rotate about pivot pin 11 when the centrifugal force attains such a magnitude as to begin to overcome gravitational force. As slotted lever 9 rotates, it will allow pawl 4 to continue to rotate as pawl arm 5 moves in lever slot 8. Throughout this process, the centrifugal force acting on the pawl 4 center of gravity 18 will cause pawl arm 5 to work against slotted lever 9 and further help to displace lumped mass 12 in the radial direction. Windage past pawl 4 also helps disengagement.

As the speed increases further, the device will reach a final position, as shown in FIG. 4. Pawl 4 will be totally out of contact with stationary ratchet 2, and further motion of pawl 4 may be prevented by the finite length of lever slot 8. Motion of pawl 4 may terminate prior to being stopped by pawl arm 5 interaction with slot 8, particularly at low rotational velocities, when a balance of gravitational and centrifugal forces (and windage) on lumped mass 12 occurs.

Upon slowing down, re-engagement is positively activated by gravity acting on lumped mass 12. Centrifugal forces decrease and cause the gravitational forces acting on lumped mass 12 to rotate lever 9 back to the original vertical position. This action will subsequently pull pawl 4 back into the engaged position through the lever 9-pawl arm 5 interaction.

During start-ups and coastdowns, some rubbing between pawl 4 and ratchet teeth 3 may occur. This phenomenon will be of short duration if the device is sized to lift clear of ratchet teeth 3 at sufficiently low speeds, as explained below. Excessive or uncontrolled bouncing motions just prior to lift-off should not occur due to the dampening effect which will be provided by the rotational inertia of lumped mass 12.

Refer to FIG. 5 which is a schematic of lumped mass 12 in an engaged 19 and disengaged 20 position. In FIG. 5, lumped mass 12 is located at radius R from the axis of rotation, lever 9 has a length L between lever pin 10 (not shown) and lumped mass 12; rotating component 1 is rotating at an angular velocity of $\omega$, $F_c$ is centrifugal force, $F_g$ is gravitational force, and parameters $\theta$, $\delta_1$, and $\delta_2$ are as indicated in FIG. 5.

Angle $\theta$ is expressive of the movement of lumped mass 12 which occurs at a specific angular velocity $\omega$ of rotating component 1. A specific angle $\theta$ corresponds to a specific clearance between pawl 4 and teeth 3.

A summation of the moments M about pin 11 when lumped mass 12 is in equilibrium at position 20 follows:

$$\Sigma M = F_g \delta_1 - F_c \delta_2 = 0 \qquad (1)$$
$$F_g \delta_1 = F_c \delta_2$$

$$F_c = \frac{F_g}{g}(R + \delta_1)\omega^2$$

(where $g$ = gravitational constant)

$$F_g \delta_1 = \frac{F_g}{g}(R + \delta_1)\omega^2 \delta_2$$

$$\frac{\delta_1}{\delta_2} = \frac{(R + \delta_1)}{g}\omega^2$$

$$\delta_1 = L \sin \theta$$
$$\delta_2 = L \cos \theta$$

$$\frac{L \sin \theta}{L \cos \theta} = \frac{(R + \delta_1)}{g}\omega^2 = \frac{(R + L \sin \theta)}{g}\omega^2$$

$$\boxed{\mathrm{TAN}\,\theta = \frac{(R + L \sin \theta)}{g}\omega^2}$$

Equation I above shows that position angle $\theta$ is a function of angular velocity $\omega$ of rotating component 1 and geometric parameters R and L only. In particular, there is no dependency of $\theta$ on the weight of lumped mass 12.

Consequently, for a specific $\omega$, perhaps chosen since it is known to be achieved by the specific rotating component 1 very quickly after start-up, or otherwise simply a low value $\omega$, and for a $\theta$ known to be necessary to achieve clearance of pawl 4 from teeth 3 to prevent bouncing with its attendant noise and wear, appropriate design parameters L and R may be determined using Equation I and iterative techniques.

Since $\theta$ is independent of the lumped mass 12 weight, this component may be as large as desired to achieve the necessary re-engagement force.

While in the foregoing, a general invention has been described, it should be understood that various changes may be made without departing from the true spirit and scope of the invention. For example, the lumped mass may have various geometric shapes. Therefore, the specification and drawings should be interpreted as illustrative rather than limiting.

We claim:

1. An anti-reverse rotation device, for a rotating component, said device comprising;
    A. a horizontal pawl, pivotally mounted on said rotating component;
    B. a stationary ratchet having teeth adapted to mesh with said pawl, preventing rotation of said rotating component in at least one direction when said pawl is pivoted into intercourse with said ratchet;

C. means for control of said pawl, said means adapted to assist disengagement of said pawl due to centrifugal forces generated on said means by rotational motion of said rotating component in an allowed direction, and to impel engagement due to gravitational force on said means.

2. An anti-reverse rotation device, for a rotating component, said device comprising;

A. a horizontal pawl, pivotally mounted on said rotating component;

B. a stationary ratchet having teeth adapted to mesh with said pawl, preventing rotation of said rotating component in at least one direction when said pawl is pivoted into intercourse with said ratchet;

C. means for control of said pawl, said means adapted to assist disengagement of said pawl due to centrifugal forces generated on said means by rotational motion of said rotating component in an allowed direction, and to impel engagement due to gravitational force on said means, said means for control of said pawl comprising a slotted lever pivotally attached to said rotating component, said lever having at one end a lumped mass and at another end beyond the pivot location of said slotted lever, having a slot disposed over an extension of said pawl, said slotted lever mounted approximately vertically when said rotating component is stationary, said lever disposed to pivot, moving said pawl, when said rotating component rotates in an allowed direction, said pivotal motion impelled by centrifugal force on said lumped mass.

3. The device of claim 2 wherein said extension of said pawl is cylindrical and said slot has rounded edges such that the geometry of the contact between said slot and said extension is cylinder-on-cylinder contact.

4. The device of claim 3 wherein said pawl is adapted to cause windage past said pawl and centrifugal force on said pawl to assist said means for control of said pawl to achieve disengagement during forward, allowed rotation of said rotating component.

* * * * *